(12) United States Patent
Barkan

(10) Patent No.: US 6,874,688 B1
(45) Date of Patent: Apr. 5, 2005

(54) DATA COLLECTION SIGNAL PROCESSING FOR INCREASED PERFORMANCE IN ELECTRO-OPTICAL READERS

(75) Inventor: Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/805,867

(22) Filed: Mar. 22, 2004

(51) Int. Cl.[7] .................................................. G06K 7/10
(52) U.S. Cl. ........................ 235/462.25; 235/462.29; 235/462.27; 235/462.01
(58) Field of Search ................... 235/462.25, 462.27, 235/462.29, 462.01, 462.15, 462.31

(56) References Cited

U.S. PATENT DOCUMENTS

| | | | | |
|---|---|---|---|---|
| 6,347,741 B1 | * | 2/2002 | Blanford et al. | 235/462.02 |
| 6,382,511 B1 | * | 5/2002 | Tang et al. | 235/462.25 |
| 6,394,351 B1 | * | 5/2002 | Keys et al. | 235/462.01 |
| 6,497,366 B1 | * | 12/2002 | Burkey et al. | 235/462.25 |
| 6,695,211 B2 | * | 2/2004 | Keys et al. | 235/462.25 |
| 6,781,932 B2 | * | 8/2004 | Beatson | 369/44.41 |

* cited by examiner

*Primary Examiner*—Michael G. Lee
*Assistant Examiner*—Kimberly D. Nguyen
(74) *Attorney, Agent, or Firm*—Kirschstein, et al.

(57) ABSTRACT

Signal processing performance in electro-optical readers is improved by changing filter characteristics and/or digitizer thresholds during successive scans.

14 Claims, 3 Drawing Sheets

DATA COLLECTION SIGNAL PROCESSING FOR INCREASED PERFORMANCE IN ELECTRO-OPTICAL READERS

BACKGROUND OF THE INVENTION

1. Field of the Invention

The present invention generally relates to electro-optical systems for reading indicia, for example, bar code symbols, having parts with different light reflectivities and, in particular, to an arrangement for, and a method of, improving the performance of data collection.

2. Description of the Related Art

Various electro-optical readers and systems have previously been developed for reading bar code symbols appearing on a label, or on a surface of a target. The bar code symbol itself is a coded pattern of indicia. Generally, the readers electro-optically transform graphic indicia of the symbols into electrical signals which are decoded into alphanumeric characters. The resulting characters describe the target and/or some characteristic of the target with which the symbol is associated. Such characters typically comprise input data to a data processing system for applications in point-of-sale processing, inventory control, article tracking and the like.

The specific arrangement of symbol elements, e.g., bars and spaces, in a symbol defines the characters represented according to a set of rules and definitions specified by a code or symbology. The relative size of the bars and spaces is determined by the type of code used, as is the actual size of the bars and spaces.

Electro-optical readers have been disclosed, for example, in U.S. Pat. No. 4,251,798; U.S. Pat. No. 4,369,361; U.S. Pat. No. 4,387,297; U.S. Pat. No. 4,409,470, U.S. Pat. No. 4,760,248 and U.S. Pat. No. 4,896,026, all of which have been assigned to the assignee of the present invention. These readers generally include a light source consisting of a gas laser or semiconductor laser for emitting a light beam. The laser beam is optically modified, typically by a focusing optical assembly, to form a beam spot having a certain size at a predetermined target location.

The light beam is directed by a scan component along a light path toward a target symbol. The reader operates by repetitively scanning the light beam in a scan pattern, for example, a line or a series of lines or scans across the target symbol by movement of the scan component such as a mirror disposed in the path of the light beam. The scan component may sweep the beam spot across the symbol, trace a scan line across and beyond the boundaries of the symbol, and/or scan a predetermined field of view.

Readers also include a data collection circuit having a sensor or photodetector which functions to detect light reflected or scattered from the symbol. The photodetector or sensor is positioned in the reader in an optical path so that it has a field of view which extends across the symbol. A portion of the light beam reflected from the symbol is collected and detected and converted into an analog electrical signal. A digitizer digitizes the analog signal. The digitized signal from the digitizer is then decoded by a decoder based upon the specific symbology used for the symbol. A microprocessor controls the overall operation.

The data collection circuit will, however, not be able to readily read, if at all, the symbol if the symbol is poorly printed or damaged. In the prior art, a single data collection channel having a digitizer circuit operative at a single threshold is typically employed to digitize the analog signal. However, if the threshold is set too high, a high level of noise resulting from printed imperfections may be thresholded out, but at the risk of thresholding out a weak signal for an actual element of the symbol. If the threshold is set too low, noise may be detected as data elements of the bar code. Hence, a single threshold is not well suited to enable a reader to readily read symbols of different print qualities, at different distances from the reader, of different symbol densities, and under different real world conditions. It is known to switch thresholds on successive scans in order to enable the reader to read different kinds of poorly printed symbols. However, it often takes several scans before a workable threshold is selected for a particular symbol being scanned. As a result, although the reader will ultimately be able to read the symbol, the reader will feel sluggish.

U.S. Pat. No. 6,497,366 discloses a dual channel data collection circuit in which light reflected from a bar code symbol is converted to a-raw analog signal, and then processed in two independent data collection channels. Each channel has its own separate preamplifier, bandpass filter, threshold generator and analog-to-digital converter. Each scan produces two output signals, with aggressive thresholding on one channel, and with less aggressive thresholding on the other channel. Reading terminates when a processor determines that an output signal is decodable.

As advantageous as this dual channel circuit is in collecting data, each scan produces the same two output signals. The characteristics of the filter and the threshold generator, for example, do not change from one scan to the next, and their default values may not be adequate to allow the symbol to be read. In addition, there is much extra cost and complexity involved in providing two identical collection channels with the same components.

SUMMARY OF THE INVENTION

Objects of the Invention

One object of this invention is to provide an improved arrangement for and method of increasing the data collection performance of a reader for reading a data-encoded symbol.

Another object of this invention is to provide an arrangement which is compact, lightweight, durable and efficient in construction and reliable in operation, and thus is ideally suited for portable hand-held applications.

Still another object of this invention is to change data collection characteristics from one scan to the next in an electro-optical reader.

FEATURES OF THE INVENTION

In keeping with these objects and others which will become apparent hereinafter, one feature of this invention resides, briefly stated, in a data collection signal processor and method in an electro-optical reader operative for scanning indicia, such as one- and/or two-dimensional bar code symbols, with light in successive scans across the indicia. The invention includes a sensor, for example, a photodiode, for collecting light reflected off the symbol for each scan, and for generating an analog signal indicative of light intensity of the reflected light collected by the sensor for each scan. A filter having a bandpass characteristic is operative for filtering the analog signal during one of the scans. A digitizer circuit is operative for digitizing the filtered analog signal to produce a pair of digitized signals for each scan. A controller, preferably a microprocessor, is operative for decoding the digitized signals for each scan and for generating a data output signal when one of the digitized signals has been decoded to signify that the symbol has been successfully read.

In accordance with this invention, the bandpass characteristic of the filter is changed to produce a differently filtered analog signal during another scan subsequent to said one scan. The changing of the bandpass characteristic can be performed automatically during successive scans, or during every other scan, or periodically, or manually. Preferably, the microprocessor generates a control signal when the symbol has not been successfully read, and the changing of the bandpass characteristic is performed in response to the generation of the control signal.

In the preferred embodiment, the default bandpass characteristic has a high bandwidth, and the changed characteristic has a low bandwidth. Since the change from a high to a low bandwidth tends to decrease the gain of the analog signal being filtered, it is desirable to simultaneously increase the gain of the analog signal during the subsequent scan.

Also, a threshold generator is included for generating a pair of thresholds for each scan. One threshold is preferably fixed, and the other threshold is variable.

Thus, this invention filters an analog signal with a first bandpass characteristic and obtains two digitized signals, each with a different threshold, during a first scan. Thereupon, during a second subsequent scan, the analog signal is filtered with a second different bandpass characteristic and obtains two more digitized signals, again each with a different threshold. This process continues, if necessary, until the symbol is successfully read. There are no separate preamplifiers, or filters, or threshold generators, or analog-to-signal generators. Multiple, different outputs during successive scans increase the chances that the symbol will be read, thereby improving reader performance.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
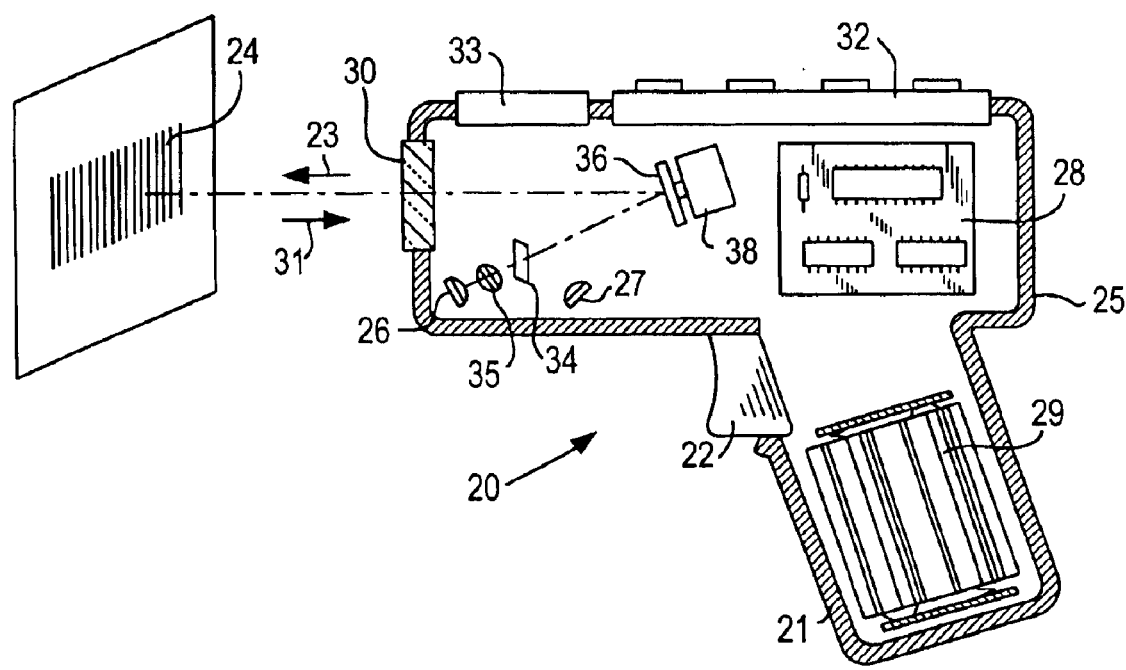
FIG. 1 is a schematic diagram of a hand-held reader for reading a bar code symbol in accordance with the prior art.

Reference numeral 20 in FIG. 1 generally identifies a hand-held reader for electro-optically reading indicia, such as bar code symbol 24, located in a range of working distances therefrom. The reader 20 has a pistol grip handle 21 and a manually actuatable trigger 22 which, when depressed, enables a light beam 23 to be directed at the symbol 24. The reader 20 includes a housing 25 in which a light source 26, a light detector 27, signal processing circuitry 28, and a battery pack 29 are accommodated. A light-transmissive window 30 at a front of the housing enables the light beam 23 to exit the housing, and allows light 31 scattered off the symbol to enter the housing. A keyboard 32 and a display 33 may advantageously be provided on a top wall of the housing for ready access thereto.

In use, an operator holding the handle 21 aims the housing at the symbol and depresses the trigger. The light source 26 emits a light beam which is optically modified and focused by an optical focusing assembly 35 to form a beam spot on the symbol 24. The beam passes through a beam splitter 34 to a scan mirror 36 which is repetitively oscillated at a scan rate of at least 20 scans a second by a motor drive 38. The scan mirror 36 reflects the beam incident thereon to the symbol 24 and sweeps the beam spot in scans across the symbol in a scan pattern. The scan pattern can be a line extending lengthwise along the symbol along a scan direction, or a series of lines arranged along mutually orthogonal directions, or an omnidirectional pattern, just to name a few possibilities.

The reflected light 31 has a variable intensity over the scan pattern and passes through the window 30 onto the scan mirror 36 where it is reflected onto the splitter 34 and, in turn, reflected to the photodetector-27 for conversion to an analog electrical signal. The signal processing circuitry 28 digitizes and decodes the signal to extract the data encoded in the symbol.

Figure 2:
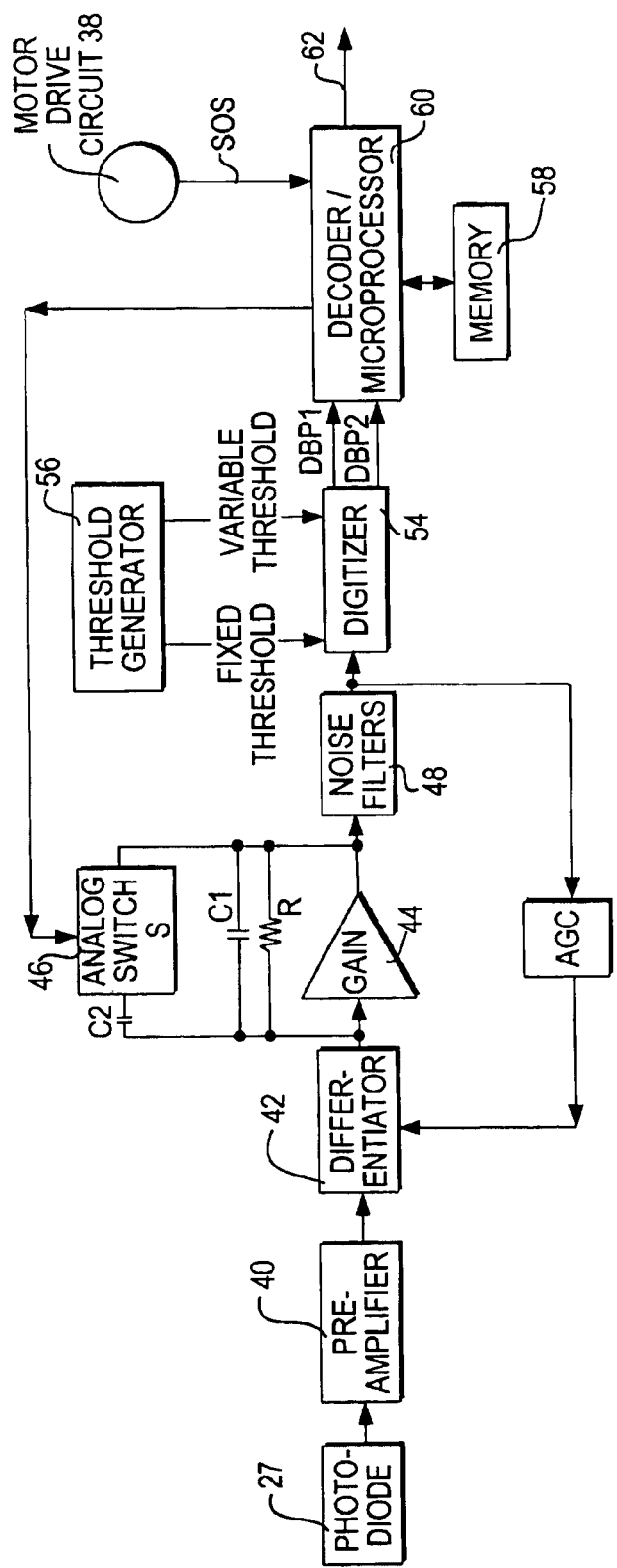
FIG. 2 is a block diagram of an arrangement in accordance with this invention for use in the reader of FIG. 1.

In accordance with this invention, the signal processing circuitry 28 is configured as shown in FIG. 2. The photodetector 27 is preferably a photodiode that generates the analog signal. The analog signal is conducted through a preamplifier 40, a differentiator 42, and a series of gain stages, one of which, as represented by a single operational amplifier 44, acts as a filter. A parallel combination of a resistor R, a capacitor C1, and another capacitor C2 in series with an analog switch 46, is connected across the input and output of the filter 44.

Figure 3:
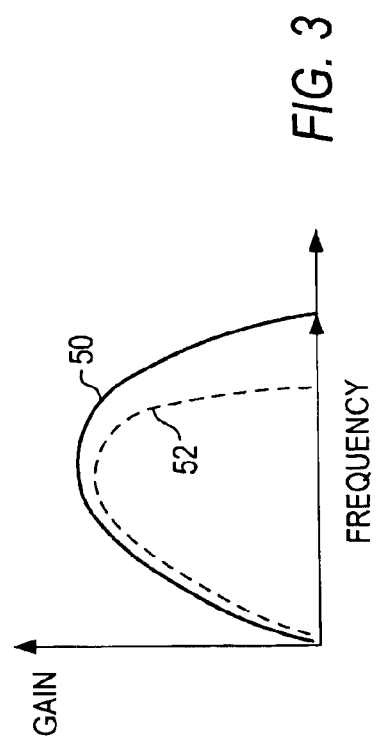
FIG. 3 is a graph depicting two different filter characteristics changed in accordance with this invention.

When the analog switch is open, the capacitor C2 is not seen across the filter 44, and the filter characteristic is depicted in FIG. 3 by the curve 50. When the analog switch is closed, the capacitor C2 is switched across the filter, and the resulting filter characteristic is depicted in FIG. 3 by the curve 52. The curve 50 is a high bandpass filter characteristic, and the curve 52 is a low bandpass filter characteristic. The signal frequency falls in the part of the filter response characteristic where it is rolling off, thereby reducing the gain. Hence, the desired signal must be in the frequency range where the characteristic is sloping down in the low bandwidth mode of operation. Since the bandwidth is reduced during the switching, the analog signal being filtered by filter 44 is reduced in amplitude. Hence, in accordance with this invention, the gain is simultaneously increased to offset this reduction in amplitude.

Figure 4:
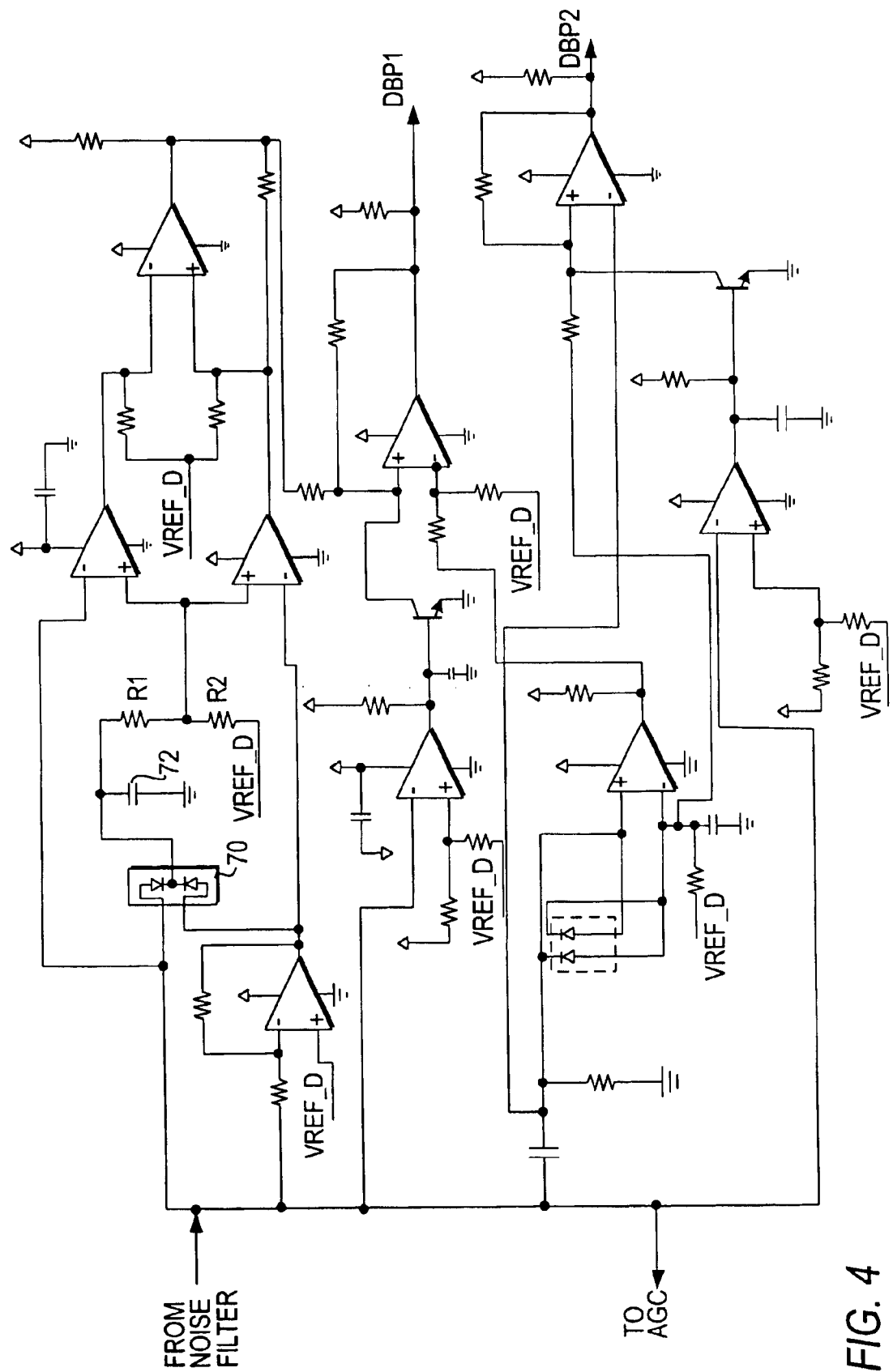
FIG. 4 is an electrical schematic of a digitizer circuit for use in the reader of FIG. 1.

The filtered analog signal is conducted through a series of noise filters 48 to a digitizer 54 operative to digitize the filtered analog signal and to obtain a pair of digitized signals DBP1, DBP2 for each scan. As best seen in FIG. 4, the digitizer includes a peak detector 70, each peak corresponding to a transition between a bar and a space of the symbol, and a peak voltage follower 72 operative to generate a voltage waveform that follows from one peak to the next. A threshold generator 56 cooperates with the digitizer 54 and sets a pair of thresholds for use with the signal processing performed inside the digitizer. One of the thresholds is preferably fixed, i.e., a constant reference voltage, and the other of the thresholds is preferably variable, e.g., a dynamic voltage that is a fraction of the voltage of the voltage waveform.

As shown in FIG. 4, a voltage divider R1, R2 generates a fractional percentage of the peak voltage, which is used as a dynamic threshold in the processing of DBP1. At the same time, another peak voltage is located by the peak locator 74, and the peak voltage, less a fixed voltage drop of a diode, is used as the fixed threshold in the processing of DBP2.

The digitized signals are simultaneously conducted to two input pins of a microprocessor 60 which is programmed to also act as a decoder to sequentially decode the digitized signals. The microprocessor 60 has a memory 58 in which both digitized signals for the first scan are stored. The first digitized signal to be decoded causes the microprocessor to generate a data output signal at output 62.

The microprocessor 60 is operatively connected to the analog switch 46 and switches the latter open or closed to change the bandpass filter characteristics of the filter 44 by switching different capacitors into the feedback loop of the filter 44. The microprocessor 60 is also connected to the threshold generator 56 and changes the pair of thresholds from one scan to the next by switching resistors in parallel with other resistors in the digitizer. Thus, by way of example, for a first scan, the filer 44 can be provided with the characteristic 50, and two digitized signals processed by a first pair of thresholds set by the microprocessor, are fed to the microprocessor for decoding. During a second subsequent scan, the filter 44 can be provided with the different characteristic 52, and two additional digitized signals processed by a second pair of thresholds set by the microprocessor, different from the first pair, are fed to the microprocessor for decoding. Thus, for each scan, two digitized, signals are generated, and during a subsequent scan, two more different digitized signals are generated. This process is repeated for a predetermined time, or until the symbol has been successfully read.

Once the symbol has been decoded, it is desirable to automatically shut off the laser and/or motor to conserve power. The bandwidth need not be changed for the next scan.

In variants of this invention, more than two thresholds can be set by the microprocessor. The changing of the characteristic of the filter 44 and/or of the thresholds can be performed automatically for every scan, or for every second or third scan, or as often as desired, or manually in response to an operator pulling the trigger 22.

The microprocessor can select bandwidths simply by alternating them, as described above, or it can analyze data from a failed reading and, based on the analysis, determine that a subsequent scan would have a better chance of decoding if a different bandwidth were used. The microprocessor would then select that-different bandwidth for the next scan.

The digitizer is preferably, as shown, a single digitizer than can simultaneously produce two digitized signals for each scan. Alternatively, two separate digitizers could be used. The single digitizer uses, as previously mentioned, a peak detector to develop thresholds that are a percentage of the height of the peaks of the filtered analog signal, or of the peaks of the first derivative (generated by differentiator 42) of the analog signal. A single set of peak detectors can be used to develop multiple thresholds by dividing down the peak voltage by different percentages using more than one voltage divider in the digitizer.

The microprocessor will attempt to decode all available digitized-signals stored in memory 58. In only one digitized signal is decodable, then the microprocessor will transmit that result as the decoded symbol. If more than one digitized signal is decodable, then the microprocessor compares the decoded symbols to see if they are the same. If so, the data is assumed to be correct. If not, the microprocessor can collect data from another scan and compare the decoded data to the previous data, or wait until the data from a subsequent scan matches the previous data.

The microprocessor 60 also is operatively connected to and drives a motor drive circuit 38. Thus, the microprocessor knows the start and end of each scan to achieve synchronization with the analog signal. The digitized signals are synchronized to each other because they were all simultaneously created from the same analog signal during the same scan. Hence, in a variation, it is possible that one digitized signal may correctly represent one part of a symbol being read, and another digitized signal may correctly represent another part of the symbol, while neither digitized signal correctly represents the entire symbol. The microprocessor can then combine the decodable parts from the digitized signals in a stitching procedure to decode the entire symbol that might not have been decodable in its entirety from an individual digitized signal.

In a given scanning environment, one particular bandwidth might be found to produce decodable data more often than another bandwidth. The microprocessor can keep statistics on which bandwidth works most often and try that one first, each time that the trigger is pulled.

The invention, therefore, enables many combinations of filtering characteristics and digitizing thresholds to be processed by the microprocessor in a shorter time period than can be achieved with a conventional system that can only try one digitized signal at a time.

It will be understood that each of the elements described above, or two or more together, also may find a useful application in other types of constructions differing from the types described above. For example, the reader need-not be a moving-beam scanner in which a light beam is swept across the symbol, but could be an imager in which light over the field of view is collected and imaged, typically by a one-or multi-line imager comprised of CCD or CMOS sensors.

While the invention has been illustrated and described as embodied in a data collection signal processing for increased performance in electro-optical-readers, it is not intended to be limited to the details shown, since various modifications and structural changes may be made without departing in any way from the spirit of the present invention. For example, the signal processor need not only be implemented in a hand-held reader.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A data collection signal processor in an electro-optical reader operative for scanning indicia with light in successive scans across the indicia, comprising:

a) a sensor for collecting light reflected off the indicia for each scan, and for generating an analog signal indicative of light intensity of the reflected light collected by the sensor for each scan;

b) a filter having a bandpass characteristic for filtering the analog signal to produce a filtered analog signal during one of the scans;

c) a digitizer circuit for digitizing the filtered analog signal to produce a pair of digitized signals for each scan;

d) a controller for decoding the digitized signals for each scan, for generating a data output signal when one of the digitized signals has been decoded to signify that the indicia has been successfully read; and e) a control component operatively connected to the controller for changing the bandpass characteristic of the filter to produce a differently filtered analog signal during another scan subsequent to said one scan.

2. The processor of claim 1, wherein the bandpass characteristic during said one scan has a high bandwidth, and wherein the control component changes the bandpass characteristic during said other subsequent scan to have a low bandwidth less than said high bandwidth.

3. The processor of claim 2, wherein the control component is also operative for simultaneously increasing a gain of the filtered analog signal during the subsequent scan.

4. The processor of claim 1, and a threshold generator for generating a pair of thresholds for each scan.

5. The processor of claim 4, wherein the pair of thresholds is different for successive scans.

6. The processor of claim 1, wherein one of the thresholds is fixed, and the other of the thresholds is variable.

7. The processor of claim 1, wherein the controller is operative for generating a control signal when the indicia has not been successfully read, and wherein the control component is operative for changing the bandpass characteristic in response to generation of the control signal.

8. A data collection method in an electro-optical reader operative for scanning indicia with light in successive scans across the indicia, comprising the steps of:

a) collecting light reflected off the indicia for each scan, and generating an analog signal indicative of light intensity of the reflected light collected for each scan;

b) filtering the analog signal with a bandpass characteristic to produce a filtered analog signal during one of the scans;

c) digitizing the filtered analog signal to produce a pair of digitized signals for each scan;

d) decoding the digitized signals for each scan, and generating a data output signal when one of the digitized signals has been decoded to signify that the indicia has been successfully read; and e) changing the bandpass characteristic to produce a differently filtered analog signal during another scan subsequent to said one scan.

9. The method of claim 8, wherein the bandpass characteristic during said one scan has a high bandwidth, and wherein the bandpass characteristic is changed during said other subsequent scan to have a low bandwidth less than said high bandwidth.

10. The method of claim 9, and the step of simultaneously increasing a gain of the filtered analog signal during the subsequent scan.

11. The method of claim 8, and the step of generating a pair of thresholds for each scan.

12. The method of claim 11, wherein one of the thresholds is fixed, and the other of the thresholds is variable.

13. The method of claim 11, wherein the pair of thresholds is different for successive scans.

14. The method of claim 8, and the step of generating a control signal when the indicia has not been successfully read, and wherein the changing step is performed in response to the generation of the control signal.

* * * * *